US011233951B2

(12) United States Patent
Baar et al.

(10) Patent No.: US 11,233,951 B2
(45) Date of Patent: Jan. 25, 2022

(54) STANDARD AND HIGH DYNAMIC RANGE DISPLAY SYSTEMS AND METHODS FOR HIGH DYNAMIC RANGE DISPLAYS

(71) Applicant: Apple Inc., Cupertino, CA (US)

(72) Inventors: Teun R. Baar, San Francisco, CA (US); Nicolas P. Bonnier, Campbell, CA (US); Adria Fores Herranz, San Jose, CA (US); Mahesh B. Chappalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/119,224

(22) Filed: Dec. 11, 2020

(65) Prior Publication Data

US 2021/0099634 A1   Apr. 1, 2021

Related U.S. Application Data

(62) Division of application No. 16/040,400, filed on Jul. 19, 2018, now Pat. No. 10,917,583.

(60) Provisional application No. 62/664,039, filed on Apr. 27, 2018.

(51) Int. Cl.
H04N 5/235 (2006.01)
H04N 7/01 (2006.01)
H04N 5/57 (2006.01)

(52) U.S. Cl.
CPC ............ H04N 5/2355 (2013.01); H04N 5/57 (2013.01); H04N 7/01 (2013.01)

(58) Field of Classification Search
CPC .......... H04N 5/2355; H04N 7/01; H04N 5/57; H04N 5/20; G09G 2320/0613; G09G 2320/0673; G09G 2320/0626; G09G 5/10; G09G 3/20; G09G 3/2003; G09G 2320/066; G06T 2207/20208; G06T 5/008
See application file for complete search history.

(56) References Cited

U.S. PATENT DOCUMENTS

| 9,762,843 B2* | 9/2017 | Terada ...................... G06F 3/14 |
| 9,955,084 B1* | 4/2018 | Haynold .................. G06T 7/30 |
| 10,104,306 B2* | 10/2018 | Chen ................ H04N 21/44008 |
| 10,609,327 B2* | 3/2020 | Tsukagoshi ............. G06T 5/009 |
| 2006/0274204 A1* | 12/2006 | Kimura .................. H04N 19/85 348/558 |
| 2011/0188744 A1* | 8/2011 | Sun ...................... H04N 5/2355 382/162 |
| 2012/0236020 A1 | 9/2012 | Paris et al. |
| 2013/0121572 A1 | 5/2013 | Paris et al. |
| 2013/0148029 A1 | 6/2013 | Gish et al. |
| 2014/0002479 A1* | 1/2014 | Muijs ....................... G09G 5/10 345/589 |
| 2014/0022460 A1 | 1/2014 | Li et al. |
| 2014/0078165 A1 | 3/2014 | Messmer et al. |

(Continued)

FOREIGN PATENT DOCUMENTS

| CN | 107786891 A | 3/2018 |
| EP | 3054417 A1 | 10/2016 |

*Primary Examiner* — Grant Sitta
(74) *Attorney, Agent, or Firm* — Aikin & Gallant, LLP

(57) ABSTRACT

Aspects of the subject technology relate to display circuitry for displaying both standard dynamic range (SDR) and high dynamic range (HDR) content with an HDR display. The subject technology provides a headroom-based transfer function that maintains the contrast of the SDR content whether the display is operated in the SDR or HDR mode.

17 Claims, 4 Drawing Sheets

(56) References Cited

U.S. PATENT DOCUMENTS

| | | | |
|---|---|---|---|
| 2014/0363093 A1* | 12/2014 | Miller | H04N 19/40 |
| | | | 382/235 |
| 2016/0205338 A1* | 7/2016 | Kozuka | H04N 5/57 |
| | | | 348/687 |
| 2016/0343348 A1* | 11/2016 | Oh | H04N 19/46 |
| 2016/0344990 A1 | 11/2016 | Kozuka et al. | |
| 2016/0358584 A1 | 12/2016 | Greenebaum et al. | |
| 2017/0026627 A1 | 1/2017 | Toma et al. | |
| 2017/0048520 A1 | 2/2017 | Seifi et al. | |
| 2017/0064334 A1 | 3/2017 | Minoo | |
| 2017/0103691 A1* | 4/2017 | Hoffman | G06T 1/60 |
| 2017/0104973 A1* | 4/2017 | Toma | H04N 7/015 |
| 2017/0105014 A1 | 4/2017 | Lee et al. | |
| 2018/0005337 A1* | 1/2018 | Kreiner | H04W 4/02 |
| 2018/0005357 A1 | 1/2018 | Lasserre et al. | |
| 2018/0068427 A1 | 3/2018 | Rotte et al. | |
| 2018/0152684 A1 | 5/2018 | Wozniak et al. | |
| 2018/0152686 A1 | 5/2018 | Wozniak et al. | |
| 2018/0213265 A1 | 7/2018 | Toma et al. | |
| 2018/0234704 A1 | 8/2018 | Atkins et al. | |
| 2018/0255207 A1 | 9/2018 | Sato et al. | |
| 2019/0045091 A1 | 2/2019 | Hamada et al. | |
| 2019/0052908 A1 | 2/2019 | Mertens et al. | |
| 2019/0080670 A1 | 3/2019 | Jung et al. | |
| 2020/0005441 A1 | 1/2020 | Pytlarz et al. | |

* cited by examiner

STANDARD AND HIGH DYNAMIC RANGE DISPLAY SYSTEMS AND METHODS FOR HIGH DYNAMIC RANGE DISPLAYS

CROSS-REFERENCE TO RELATED APPLICATIONS

This application is a divisional of co-pending U.S. application Ser. No. 16/040,400, filed Jul. 19, 2018, which claims the benefit of U.S. Provisional Patent Application No. 62/664,039, filed on Apr. 27, 2018, both of which are incorporated herein by reference.

TECHNICAL FIELD

The present description relates generally to electronic devices with displays, and more particularly, but not exclusively, to standard and high dynamic range display systems and methods for high dynamic range displays.

BACKGROUND

Electronic devices such as computers, media players, cellular telephones, set-top boxes, and other electronic equipment are often provided with displays for displaying visual information.

Content for an electronic device display is typically provided with a standard dynamic range (SDR) of luminance values. The standard dynamic range (SDR) of luminance values is often consistent with the well-known sRGB color space or the Recommendation BT.709 (Rec. 709) color space of the International Telecommunication Union Radiocommunication Sector (ITU-R), which support luminance values of up to around 100 nits.

However, some electronic device displays, often referred to as high dynamic range (HDR) displays, are capable of providing luminances as high as 1000 nits or higher. Increasingly, HDR content is being provided in which the maximum luminance for display is higher than 100 nits, to take advantage of the availability of HDR displays. However, HDR displays are often used to display SDR content. When displaying SDR content with an HDR display, undesired visual artifacts, such as loss of content visibility and/or an inconsistency in the look of the displayed content between different display driving modes, can arise.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
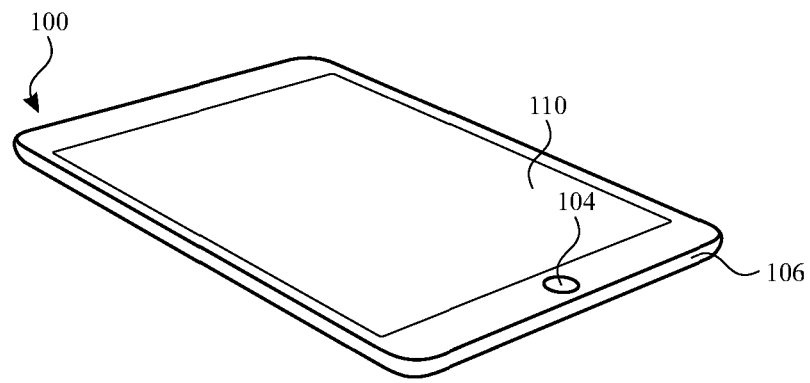
FIG. 1 illustrates a perspective view of an example electronic device having a display in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides electronic devices such as smartphones, tablet computers, media players, desktop computers, set-top boxes, wireless access points, and other electronic equipment that may include displays. Displays are used to present visual information and status data and/or may be used to gather user input data. A display includes an array of display pixels. Each display pixel may include one or more colored subpixels for displaying color images. For example, each display pixel may include a red subpixel, a green subpixel, and blue subpixel. It should be appreciated that, although the description that follows often describes operations associated with a display pixel, in implementations in which each display pixel includes multiple subpixels, the circuitry and operations described herein can be applied and/or performed, per color, for each subpixel of the display pixel.

Digital pixel values for operating display pixels can have associated values from, for example, 0 to 255. Each display has a characteristic electro-optical transfer function (EOTF) that determines the luminance output of a display pixel that results from each digital pixel value. Because the EOTF of a display is typically not linear, display control circuitry for the display may apply an opto-electronic transfer function (OETF) to content to be displayed by the display, to counter or adapt to the non-linearity of the display EOTF.

Electronic devices described herein may include high dynamic range (HDR) displays that can generate output luminances of as high as, or higher than, 1000 nits. However, standard dynamic range (SDR) content, in which the full range of available digital pixel values (e.g., integers from 0-255) are used to generate luminances in a standard dynamic range that is smaller than the dynamic range of the display (e.g., less than about 100 nits), is often provided for display with an HDR display.

When only SDR content is received for display, an HDR display may apply a standard encoding transfer function (e.g., a standardized OETF) to generate digital pixel values for display. However, when it is desired to utilize the higher luminance capability of the display (e.g., to display HDR content together with or shortly before or after the SDR content), the electronic device may scale down the SDR content so that the SDR content utilizes a smaller range of digital pixel values (e.g., a range values from of 0-63). In this way, headroom is created in the digital pixel values that can be used for displaying HDR content (e.g., using pixel values from 64-255). In order to maintain the output luminance when the SDR content is scaled down, the overall luminance of the display may be scaled up.

The scaling down of the SDR content may include applying a linear scaling factor (sometimes referred to herein as a headroom factor) to the SDR content before encoding the SDR content into digital pixel values. However, if care is not taken, when the encoding is applied to the scaled SDR content, various aspects of the front-of-screen appearance of the SDR content can be undesirably changed. For example, the contrast between displayed low and/or medium grey levels in the scaled SDR content can be visibly different from a display of unscaled SDR content, which can be unpleasant to a viewing user.

In accordance with some aspects of the subject disclosure, which are described in further detail hereinafter, systems and methods for operating a high dynamic range display to consistently display standard dynamic range content are provided. For example, display control circuitry may obtain a headroom factor that has been applied to SDR content for display, and generate digital pixel values for displaying the SDR content by applying a transfer function that is dependent on the obtained headroom factor. The transfer function may include various portions that depend differently on the obtained headroom factor and/or may be applied to different ranges of the SDR content. The ranges may have boundaries that depend on the obtained headroom factor.

It should also be appreciated that headroom-dependent modifications to display content and/or pixel luminance can be applied in operational scenarios other than scenarios in which SDR content is displayed in an HDR mode of an HDR display (e.g., in any operational scenario in which display content values are scaled or otherwise reduced or increased by a headroom modification, relative to the range of desired luminances for those values). The systems and methods described herein, in which a transfer function that is dependent on the headroom modification is applied, can be beneficial in any of these operational scenarios (e.g., to preserve the contrast of the displayed content and avoid other visual artifacts as described herein).

An illustrative electronic device having a display is shown in FIG. 1. In the example of FIG. 1, device 100 has been implemented using a housing that is sufficiently small to be portable and carried by a user (e.g., device 100 of FIG. 1 may be a handheld electronic device such as a tablet computer or a cellular telephone). As shown in FIG. 1, device 100 includes a display such as display 110 mounted on the front of housing 106. Display 110 may be substantially filled with active display pixels or may have an active portion and an inactive portion. Display 110 may have openings (e.g., openings in the inactive or active portions of display 110) such as an opening to accommodate button 104 and/or other openings such as an opening to accommodate a speaker, a light source, or a camera.

Display 110 may be a touch screen that incorporates capacitive touch electrodes or other touch sensor components or may be a display that is not touch-sensitive. Display 110 includes display pixels formed from light-emitting diodes (LEDs), organic light-emitting diodes (OLEDs), plasma cells, electrophoretic display elements, electrowetting display elements, liquid crystal display (LCD) components, or other suitable display pixel structures. In various implementations, any suitable type of display technology may be used in forming display 110 if desired. Display 110 may be a high dynamic range (HDR) display capable of emitting light with luminance values between, for example, 0.005 nits and 1000 nits with a contrast ratio of, for example, 10000:1 or 20000:1.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a somewhat smaller portable device such as a wrist-watch device, a pendant device, or other wearable or miniature device, a media player, a gaming device, a navigation device, a computer monitor, a television, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations.

In some implementations, electronic device 100 may be provided in the form of a computer integrated into a computer monitor. Display 110 may be mounted on a front surface of housing 106 and a stand may be provided to support housing (e.g., on a desktop).

Figure 2:
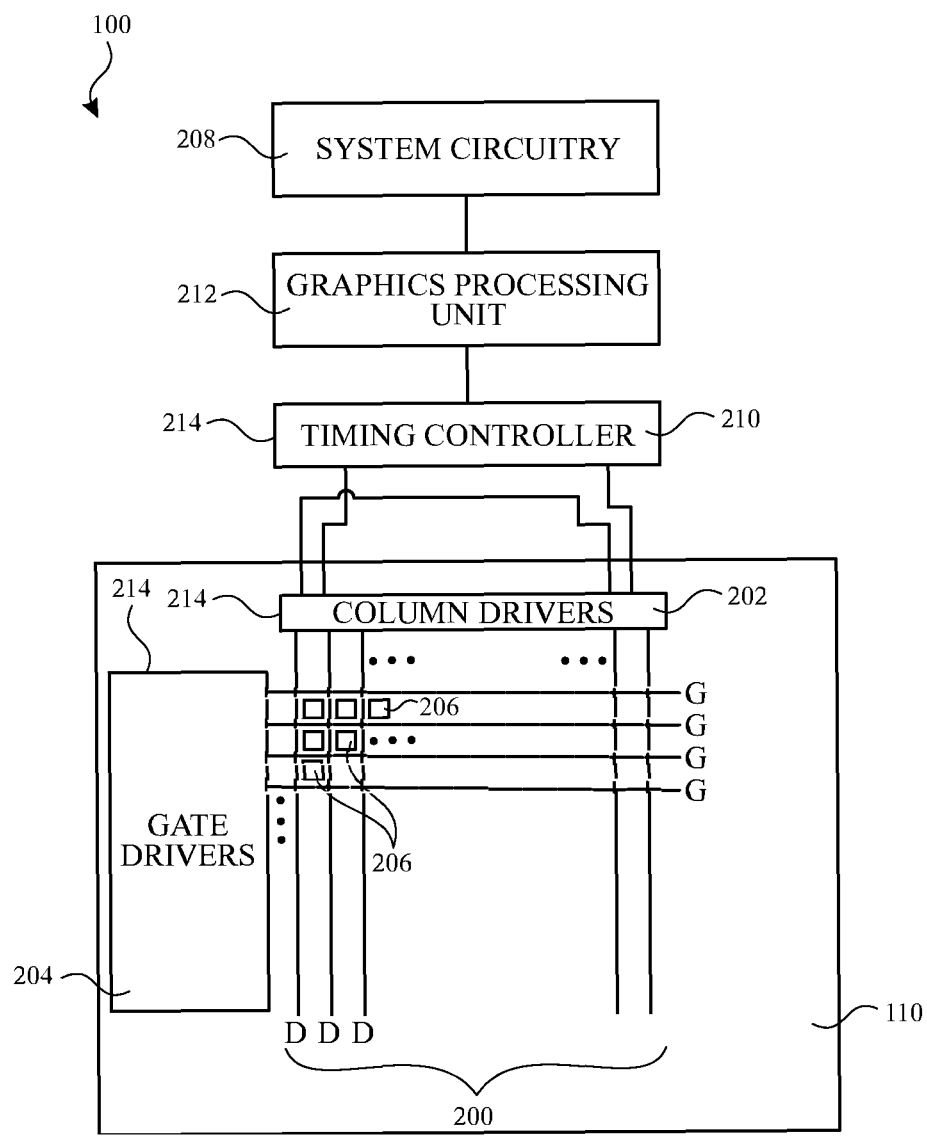
FIG. 2 illustrates a schematic diagram of exemplary display circuitry in accordance with various aspects of the subject technology.

FIG. 2 is a schematic diagram of device 100 showing illustrative circuitry that may be used in displaying images for a user of device 100 on pixel array 200 of display 110. As shown in FIG. 2, display 110 may include column driver circuitry 202 that drives data signals (analog voltages) onto the data lines D of array 200. Gate driver circuitry 204 may drive gate line signals onto gate lines G of array 200.

Using the data lines D and gate lines G, display pixels 206 may be operated to display images on display 110 for a user. In some implementations, gate driver circuitry 204 may be implemented using thin-film transistor circuitry on a display substrate such as a glass or plastic display substrate or may be implemented using integrated circuits that are mounted on the display substrate or attached to the display substrate by a flexible printed circuit or other connecting layer. In some implementations, column driver circuitry 202 may be implemented using one or more column driver integrated circuits that are mounted on the display substrate or using column driver circuits mounted on other substrates.

Device 100 may include system circuitry 208. System circuitry 208 may include one or more different types of storage such as hard disk drive storage, nonvolatile memory (e.g., flash memory or other electrically-programmable-read-only memory), volatile memory (e.g., static or dynamic random-access-memory), magnetic or optical storage, permanent or removable storage and/or other non-transitory storage media configure to store static data, dynamic data, and/or computer readable instructions for processing circuitry in system circuitry 208. Processing circuitry in system circuitry 208 may be used in controlling the operation of device 100. Processing circuitry in system circuitry 208 may sometimes be referred to herein as system circuitry or a system-on-chip (SOC) for device 100.

The processing circuitry may be based on a processor such as a microprocessor and other suitable integrated circuits, multi-core processors, one or more application specific integrated circuits (ASICs) or field programmable gate arrays (FPGAs) that execute sequences of instructions or code, as examples. In one suitable arrangement, system circuitry 208 may be used to run software for device 100, such as internet browsing applications, email applications, media playback applications, operating system functions, software for capturing and processing images, software implementing functions associated with gathering and processing sensor data, software that makes adjustments to display brightness, scales digital display content to generate headroom for HDR content display, adjusts touch sensor functionality, etc.

During operation of device 100, system circuitry 208 may generate or receive data that is to be displayed on display 110. The display data may be received in image pixel values, linear color space values, or other formats. This display data may be processed, scaled, modified, and/or provided to display control circuitry such as graphics processing unit (GPU) 212. For example display frames, including display pixel values (e.g., each corresponding to a grey level) for display using pixels 206 (e.g., colored subpixels such as red, green, and blue subpixels) may be provided from system circuitry 208 to GPU 212. GPU 212 may process the display frames and provide processed display frames to timing controller integrated circuit 210.

System circuitry 208 and/or GPU 212 may, for example, determine that the digital display data includes only SDR content and may process and/or pass the data to timing controller 210 and instruct display control circuitry 214 to operate pixels 206 in a standard dynamic range (SDR) mode. In other operational scenarios, system circuitry 208 and/or GPU 212 may determine that the digital display data includes only HDR content and may process and/or pass the data to timing controller 210 and instruct display control circuitry 214 to operate in an HDR mode (e.g., by increasing the overall luminance of the display, relative to the SDR mode, for all received display pixel values). In some operational scenarios, system circuitry 208 and/or GPU 212 may determine that the digital display data includes SDR content and HDR content, and may scale down (or otherwise decrease) the SDR content before processing and/or passing the data to timing controller 210 for display in the HDR mode.

Scaling down the SDR content may include generating or receiving a scaling factor by which the overall luminance of the display is to be increased to switch from the SDR mode to the HDR mode, and applying that scaling factor as a headroom factor to the SDR content (e.g., by dividing the SDR content by the headroom factor or multiplying the SDR content by the inverse of the headroom factor). If the SDR content has been provided in pixel values corresponding to a color space with a known transfer function already applied (e.g., if a JPEG image in the sRGB color space is provided for display), the inverse of the known transfer function may be applied to the SDR content to linearize the SDR content before headroom scaling.

Timing controller 210 and/or other portions of display control circuitry 214 (and/or GPU 212) may apply an appropriate transfer function to the digital display data, depending on whether the digital display data includes SDR content for display in the SDR mode, HDR content for display in the HDR mode, and/or SDR content for display in the HDR mode. When SDR content is provided for display in the HDR mode (e.g., and the SDR content has been scaled by the headroom scaling factor), the transfer function may be a non-linear modification of the SDR content that is based on the headroom scaling factor. As described in further detail hereinafter, the transfer function may be a piecewise opto-electronic transfer function or OETF (e.g., having multiple portions each with a particular exponentiation of the headroom scaling factor and/or each being applied to a range of SDR content values that is bounded by a value that depends on the headroom scaling factor).

Applying the transfer function generates digital pixel values to be applied with pixels 206 to generate the desired display light. Timing controller 210 provides digital display data (e.g., the digital pixel values each corresponding to a grey level for display) to column driver circuitry 202. Column driver circuitry 202 may receive the digital display data from timing controller 210. Using digital-to-analog converter circuitry within column driver circuitry 202, column driver circuitry 202 may provide corresponding analog output signals on the data lines D running along the columns of display pixels 206 of array 200.

The luminance of the display light that is generated by pixels 206 may relate to the digital display data received by column driver circuitry 202 by an electro-optical transfer function (EOTF) that is, for example, an intrinsic characteristic of the display. Column driver circuitry 202 or other display circuitry may scale the EOTF of the display for operation in the HDR mode. For example, in an SDR mode of operation for the display, a digital pixel value of 255 may generate an output luminance 100 nits. In an HDR mode of operation for the display, the digital pixel value of 255 may generate an output luminance of 400 nits. In this way, the HDR capabilities of the display can be used to output luminances above the standard dynamic display range. In this example scenario, SDR content for display in the HDR mode may be scaled down so that the desired 100 nits output luminance for a particular pixel can be achieved, even in the HDR mode (e.g., by scaling the 255 value for that pixel down to a smaller pixel value such as 64). The selection and application of the appropriate OETF may help reduce changes in visible contrast due to these scalings and may further alter the reduced pixel values of some pixels.

Graphics processing unit 212 and timing controller 210 may sometimes collectively be referred to herein as display control circuitry 214. Display control circuitry 214 may be used in controlling the operation of display 110. Display control circuitry 214 may sometimes be referred to herein as a display driver, a display controller, a display driver integrated circuit (IC), or a driver IC. Graphics processing unit 212 and timing controller 210 may be formed in a common package (e.g., an SOC package) or may be implemented separately (e.g., as separate integrated circuits). In some implementations, timing controller 210 may be implemented separately as a display driver, a display controller, a display driver integrated circuit (IC), or a driver IC that receives processed display data from graphics processing unit 212. Accordingly, in some implementations, graphics processing unit 212 may be considered to be part of the system circuitry (e.g., together with system circuitry 208) that provides display data to the display control circuitry (e.g., implemented as timing controller 210, gate drivers 204, and/or column drivers 202). Although a signal gate line G and a single data line D for each pixel 206 are illustrated in FIG. 2, this is merely illustrative and one or more additional row-wise and/or column-wise control lines may be coupled to each pixel 206 in various implementations.

Figure 3:
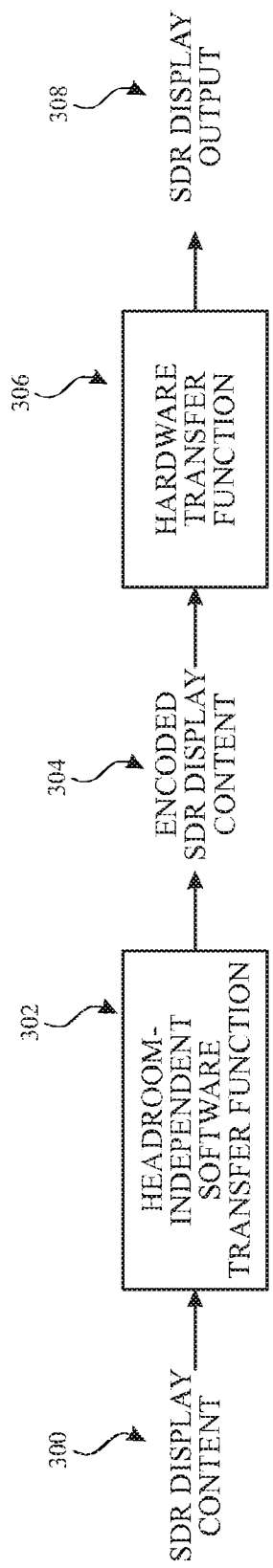
FIG. 3 illustrates a flow diagram for displaying standard dynamic range content in a standard dynamic range mode of a high dynamic range display in accordance with various aspects of the subject technology.
Figure 4:
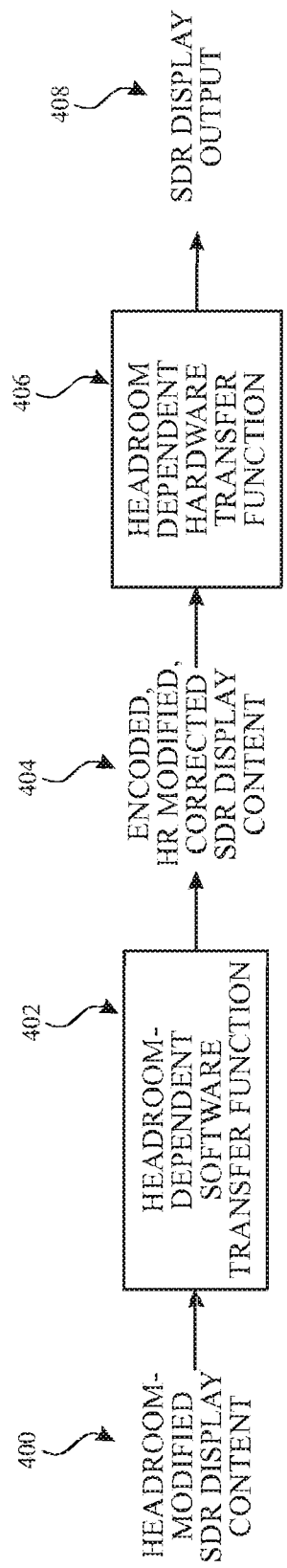
FIG. 4 illustrates a flow diagram for displaying standard dynamic range content in a high dynamic range mode of a high dynamic range display in accordance with various aspects of the subject technology.
Figure 5:
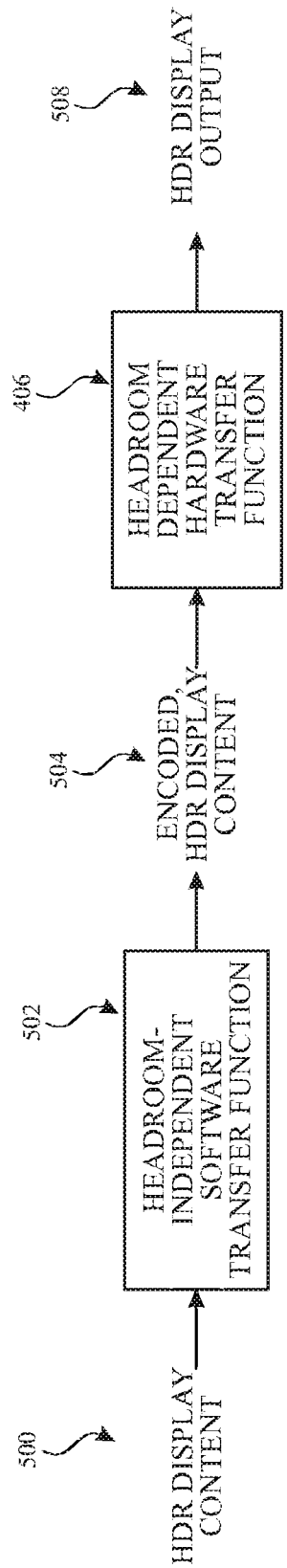
FIG. 5 illustrates a flow diagram for displaying high dynamic range content in a high dynamic range mode of a high dynamic range display in accordance with various aspects of the subject technology.

FIGS. 3-5 schematically show how display content to be displayed by HDR display 110 may be processed (e.g., using the components of FIG. 2) to consistently display SDR content in both SDR and HDR modes of operation for the display. In particular, FIG. 3 illustrates an operation for displaying SDR display content 300 is an SDR mode for display 110.

SDR content 300 may include linear content values for display. In the example of FIG. 3, SDR content 300 is processed (e.g., by GPU 212 and/or display control circuitry 214) by applying headroom-independent software transfer function 302. Headroom-independent software transfer function 302 may be an OETF that encodes SDR content 300 into encoded SDR display content 304 (e.g., digital pixel values) in a way that at least partially compensates for hardware transfer function 306 (e.g., a non-linear EOTF) so that SDR display output 308 correlates in the desired manner (e.g., with the desired luminance and contrast) with SDR display content 300.

Applying hardware transfer function (or EOTF) 306 may be achieved by operating display pixels 206 to display encoded SDR display content 304. As indicated, OETF 302 is independent of headroom for display of SDR content in an SDR mode. OETF 302 may, for example, be a standard OETF such as the gamma function of the sRGB or Rec. 709 standards. EOTF 306 may be an inverse of OETF 302 or may be different from the inverse of OETF 302. Applying an EOTF 306 that is different from the inverse of OETF 302 can generate a particular look (e.g., contrast) for displayed content that can be recognizable to a user, and that may be desirable to preserve for the user in different display driving modes (e.g., using the operations described below in connection with FIGS. 4-7).

In contrast to FIG. 3, FIG. 4 illustrates operations that may be performed for displaying SDR content in an HDR mode for display 110. As shown in FIG. 4, display control circuitry such as display control circuitry 214 or GPU 212 may receive headroom-modified SDR content such as headroom-scaled SDR content 400 (e.g., from system circuitry 208). Headroom-modified SDR content 400 may be digital content for display with display pixels 206, the digital content having been modified (e.g., reduced by a headroom reduction such as by being scaled by a headroom factor) for high dynamic range operation of the display. For example, headroom-modified SDR content 400 may include linear color space values that span a reduced range (e.g., by application of a headroom factor that is a multiplicative factor that, when applied, scales the original linear color space values to reduce the range). A transfer function 402 that is based on the headroom modification (e.g., based on the headroom factor) may be applied to headroom-modified digital content 400 (e.g., the scaled linear color space values).

Headroom-dependent software transfer function 402 may be an OETF that encodes headroom-modified SDR content 400 into encoded, modified (e.g., scaled), corrected SDR display content 404 (e.g., digital pixel values) in a way that at least partially compensates for a modified (e.g., scaled) hardware transfer function 406 (e.g., a non-linear EOTF such as EOTF 306 that is modified based on the headroom modification applied to the SDR display content, such as by scaling of the EOTF 306 up by the headroom factor) so that SDR display output 408 correlates in the desired manner (e.g., with the desired luminance and contrast) with the luminance, color, and contrast characteristics of SDR display output 308, but specific to the content in content 400.

As indicated, OETF 402 is dependent on the headroom modification (e.g., the scaling factor) applied to headroom-modified SDR display content 400. For example, transfer function 402 may include at least one exponentiation of the headroom factor. The at least one exponentiation of the headroom factor may include a plurality of different exponentiations of the headroom factor, each of the different exponentiations associated with a different exponent for the headroom factor. Display control circuitry 214 and/or GPU 212 may select from the different exponentiations based on a comparison of headroom-scaled SDR display content 400 to a boundary value that depends on the headroom factor. For example, transfer function 402 may be a piecewise transfer function in which the headroom factor is exponentiated differently for different ranges of headroom-scaled SDR display content 400, the ranges defined by boundary values that also depend on the headroom factor.

As shown in FIG. 5, display control circuitry 214 and/or GPU 212 may apply an additional transfer function 502, that is independent of the headroom factor, to HDR display content 500 (which may be another portion of the digital content that includes SDR content 400) for display using pixels 206. Standard dynamic range content 300 and 400 may be associated with a maximum luminance. High dynamic range content 500 includes at least one value associated with a luminance that is greater than the maximum luminance of the standard dynamic range content.

Headroom-independent software transfer function 502 may be an OETF that is different from OETF 302 and OETF 402, and encodes HDR content 500 into encoded HDR display content 504 (e.g., digital pixel values) in a way that at least partially compensates for headroom-modified (e.g., scaled) hardware transfer function 406 (e.g., a non-linear EOTF) so that HDR display output 508 correlates in the desired manner (e.g., with the desired luminance and contrast) with HDR display content 500.

Figure 6:
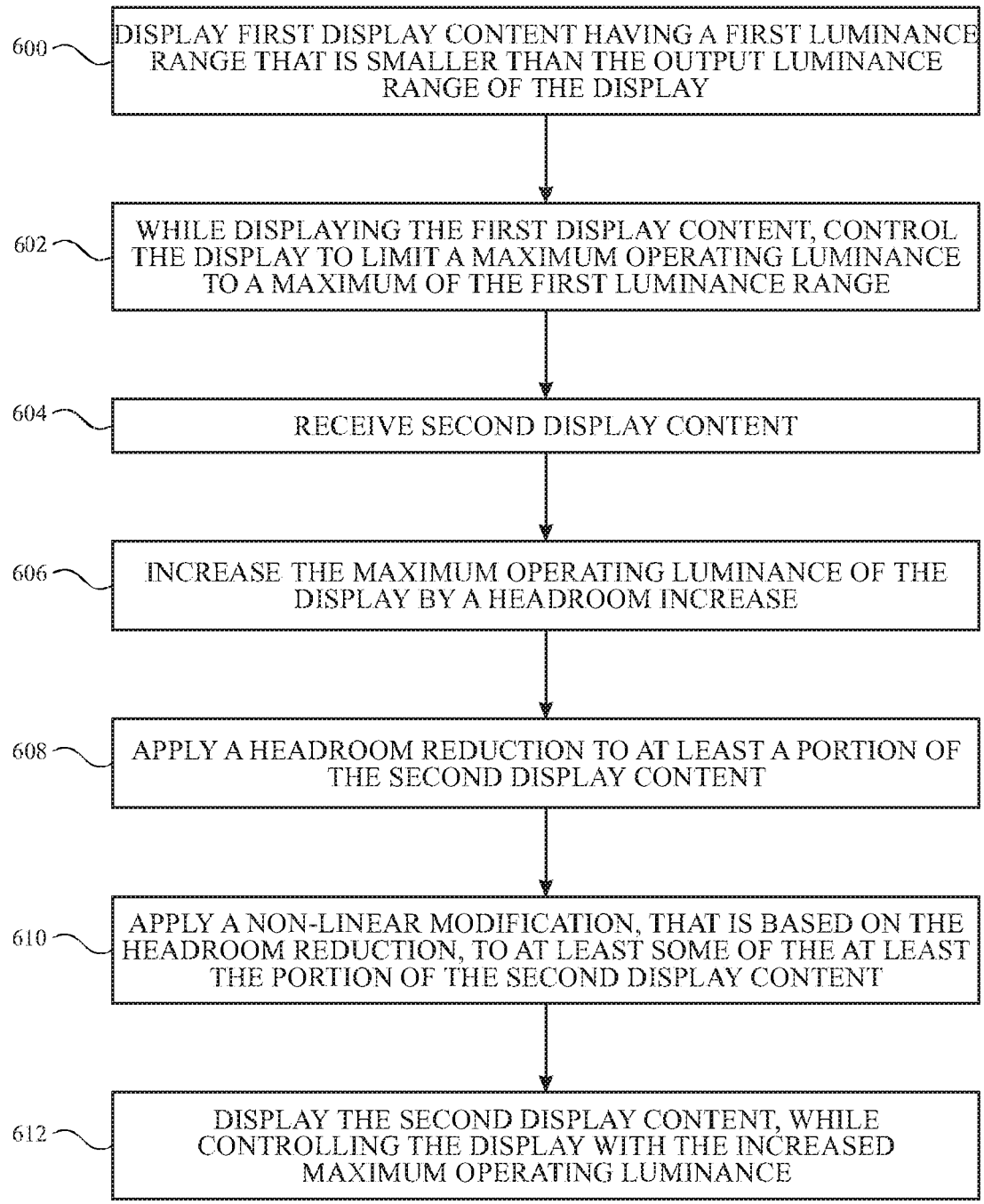
FIG. 6 illustrates a flow chart of illustrative operations for a high dynamic range display in accordance with various aspects of the subject technology.

FIG. 6 depicts a flow diagram of an example process for displaying SDR content and/or HDR content with HDR displays in accordance with various aspects of the subject technology. For explanatory purposes, the example process of FIG. 6 is described herein with reference to the components of FIGS. 1-5. Further for explanatory purposes, the blocks of the example process of FIG. 6 are described herein as occurring in series, or linearly. However, multiple blocks of the example process of FIG. 6 may occur in parallel. In addition, the blocks of the example process of FIG. 6 need not be performed in the order shown and/or one or more of the blocks of the example process of FIG. 6 need not be performed.

In the depicted example flow diagram, at block 600, first display content such as SDR content 300 having a first luminance range that is smaller than the output luminance range of the display is displayed. Displaying the first display content may include applying transfer function 302 and operating pixels 206 to display encoded SDR content 304.

At block 602, while displaying the first display content, the display may be controlled to limit a maximum operating luminance to a maximum of the first luminance range. In this way, the display is operated in an SDR mode to display SDR content 300.

At block 604, the display (e.g., display control circuitry 214 and/or GPU 212) may receive second display content. The second display content may include SDR content and HDR content.

At block 606, display control circuitry 214 increases the maximum operating luminance of the display by a headroom increase (e.g., by a scaling factor such as a factor of two, four, six, eight, etc.).

At block 608, system circuitry 208 may apply a headroom reduction (e.g., by applying an inverse of the scaling factor) to at least a portion of the second display content (e.g., the SDR content portion of the second display content to generate headroom-scaled SDR display content 400).

At block 610, display control circuitry 214 and/or GPU 212 may apply a non-linear modification that is based on the headroom reduction and/or the headroom increase, (e.g., by applying headroom-dependent software transfer function 402) to at least some of the at least the portion of the second display content. The non-linear modification that is based on the scaling factor may be a piecewise modification of the SDR portion of the second display content. The piecewise modification may include an application of a plurality non-linear transfer functions, each uniquely based on the scaling factor (e.g., each including a unique exponentiation of the scaling factor). Each of the plurality non-linear transfer functions is associated with a range that is based on the scaling factor such that the piecewise breakup of the headroom-dependent software transfer function 402 is by ranges that are bounded based on a comparison of the content to be displayed with a value that depends on the headroom scaling factor.

At block 612 display 110 may display the second display content (e.g., encoded, modified, corrected SDR display content 404), while controlling the display with the increased maximum operating luminance (e.g., in the HDR mode).

It should be appreciated that display 110 may also apply a non-linear modification that is independent of the scaling factor (e.g., OETF 502) to another portion of the second display content (e.g., HDR display content 500) prior to displaying the second display content. The other portion of the second display content (e.g., the HDR portion) includes content such as one or more pixel values having a luminance that is outside the first luminance range of the first display content. The non-linear modification that is independent of the headroom reduction to the SDR content (e.g., the scaling factor for the SDR content) is applied to the other portion of the second display content (e.g., the HDR portion) without applying the headroom reduction (e.g., without applying the inverse of the scaling factor) to the other portion of the second display content. In this way, SDR content is displayed with its intended luminance while allowing headroom for the display of the HDR content.

Figure 7:
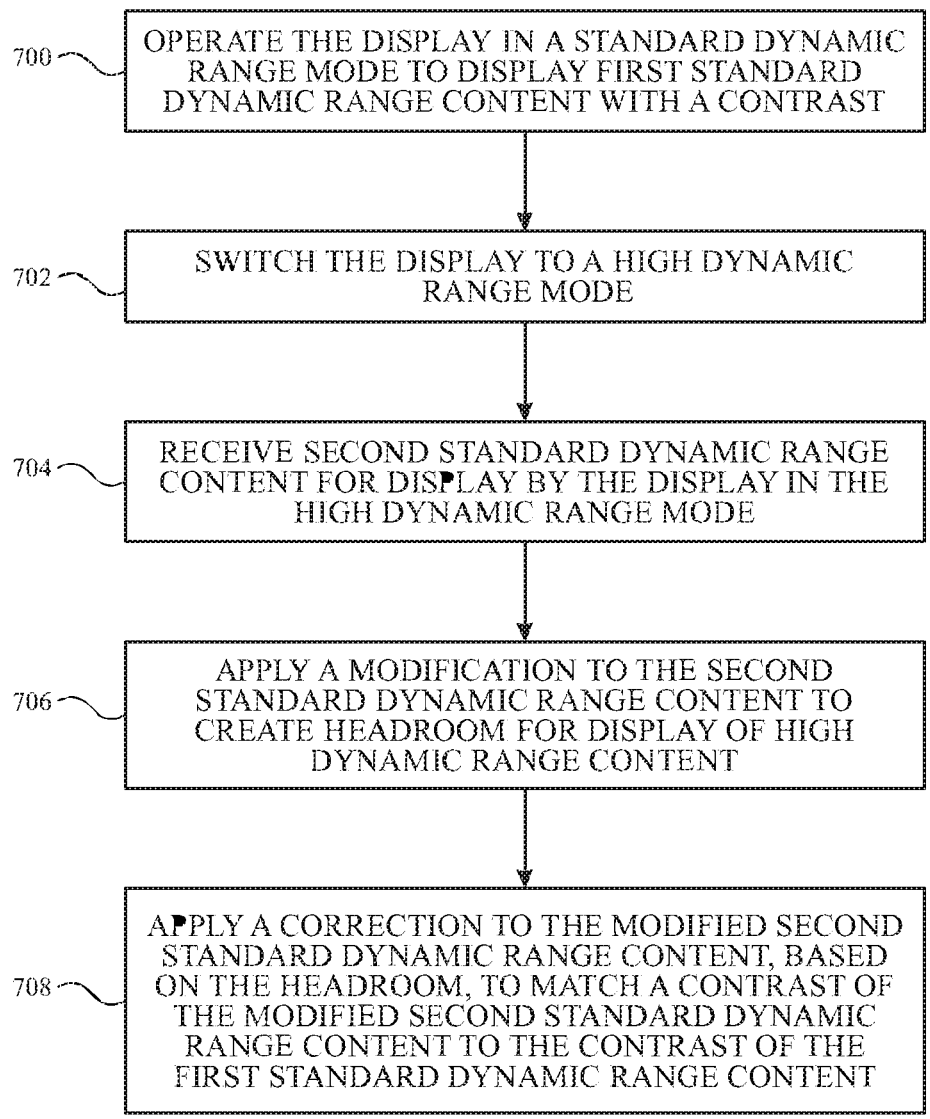
FIG. 7 illustrates another flow chart of illustrative operations for a high dynamic range display in accordance with various aspects of the subject technology.

FIG. 7 depicts a flow diagram of another example process for displaying SDR content and/or HDR content with HDR displays in accordance with various aspects of the subject technology. For explanatory purposes, the example process of FIG. 7 is described herein with reference to the components of FIGS. 1-5. Further for explanatory purposes, the blocks of the example process of FIG. 7 are described herein as occurring in series, or linearly. However, multiple blocks of the example process of FIG. 7 may occur in parallel. In addition, the blocks of the example process of FIG. 7 need not be performed in the order shown and/or one or more of the blocks of the example process of FIG. 7 need not be performed.

In the depicted example process, at block 700, an HDR display such as display 110 is operated in a standard dynamic range mode to display first standard dynamic range content (e.g., SDR display content 300) with a contrast. The contrast of the displayed first standard dynamic range content may be determined, at least in part, by the application of both OETF 302 and EOTF 306.

At block 702, the display is switched into to a high dynamic range mode. Switching the display to the HDR mode may include increasing, by a headroom factor, the luminance output of all pixels 206 for all pixel values (e.g., by scaling the voltage corresponding to a particular pixel value by the headroom factor).

At block 704, second standard dynamic range content is received for display by the display in the high dynamic range mode.

At block 706, a modification is applied (e.g., by system circuitry 208 or display circuitry 214 or 212) to the second standard dynamic range content (e.g., by applying a headroom scaling factor) to create headroom (e.g., in the digital counts for the pixel values) for display of high dynamic range content. The modification may be a linear scaling. Applying the modification to the second standard dynamic range content may generate headroom-scaled SDR display content 400, for example.

At block 708, a correction is applied to the modified second standard dynamic range content (e.g., content 400), based on the headroom, (e.g., by applying headroom-dependent software transfer function 402 to the second standard dynamic range content). The correction may be an opto-electronic transfer function based on an amount of the headroom (e.g., the magnitude of the headroom scaling factor). The opto-electronic transfer function may be a piecewise function having a plurality of piecewise portions that are differently dependent on the amount of the headroom. The piecewise function defines a plurality of ranges for which each of the plurality of piecewise portions are to be applied, and each of which has a boundary defined in part by the amount of the headroom. In this way, a contrast of the modified second standard dynamic range content (e.g., the contrast of content 400) may be matched to the contrast of the first standard dynamic range content (e.g., SDR display content 300).

It should be appreciated that the display may then display (e.g., by operating pixels 206 using display control circuitry 214) the modified corrected standard dynamic range content with the display in the high dynamic range mode. The display may also display high dynamic range content (e.g., HDR display content 500) concurrently with displaying the modified corrected standard dynamic range content (e.g., content 404) with the display in the high dynamic range mode. The high dynamic range content is displayed without applying the modification or the correction to the high dynamic range content.

In accordance with various aspects of the subject disclosure, an electronic device with a display is provided, the display including a plurality of pixels and circuitry electrically coupled with the plurality of pixels. The circuitry is configured to receive digital content for display with the plurality of display pixels, the digital content having been modified by a headroom modification for high dynamic range operation of the display. The circuitry is further configured to apply a transfer function that is based on the headroom modification to a portion of the digital content.

In accordance with other aspects of the subject disclosure, a method of operating an electronic device display having an output luminance range is provided, the method including displaying first display content having a first luminance range that is smaller than the output luminance range of the display. The method also includes, while displaying the first display content, controlling the display to limit a maximum operating luminance to a maximum of the first luminance range. The method also includes receiving second display content. The method also includes increasing the maximum operating luminance of the display by a scaling factor. The method also includes applying an inverse of the scaling factor to at least a portion of the second display content. The method also includes applying a non-linear modification, that is based on the scaling factor, to at least some of the at least the portion of the second display content. The method also includes displaying the second display content, while controlling the display with the increased maximum operating luminance.

In accordance with other aspects of the subject disclosure, a method of operating a display of an electronic device is provided, the method including operating the display in a standard dynamic range mode to display first standard dynamic range content with a contrast. The method also includes switching the display to a high dynamic range mode. The method also includes receiving second standard dynamic range content for display by the display in the high dynamic range mode. The method also includes applying a modification to the second standard dynamic range content to create headroom for display of high dynamic range content. The method also includes applying a correction to the modified second standard dynamic range content, based on the headroom, to match a contrast of the modified second standard dynamic range content to the contrast of the first standard dynamic range content.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of operating an electronic device display having an output luminance range, the method comprising:
    displaying first display content having a first luminance range that is smaller than the output luminance range of the display;
    receiving second display content;
    increasing an operating luminance of the display by a scaling factor;
    applying an inverse of the scaling factor to at least a portion of the second display content to generate headroom-scaled display content;
    applying a non-linear modification, that is based on the scaling factor, to at least some of the at least the portion of the second display content; and
    displaying the second display content, while controlling the display with the increased operating luminance.

2. The method of claim 1, further comprising:
    while displaying the first display content, controlling the display to limit the operating luminance to a maximum of the first luminance range.

3. The method of claim 1, wherein the second display content includes standard dynamic range (SDR) content and high dynamic range (HDR) content with the SDR content being displayed with intended luminance while allowing headroom for display of the HDR content.

4. The method of claim 1, further comprising:
    applying a non-linear modification that is independent of the scaling factor to another portion of the second display content prior to displaying the second display content.

5. The method of claim 4, wherein applying the non-linear modification that is independent of the scaling factor to the other portion of the second display content comprises applying the non-linear modification without applying the inverse of the scaling factor to the other portion of the second display content.

6. The method of claim 4, wherein the non-linear modification that is based on the scaling factor comprises a piecewise modification of the at least some of the at least the portion of the second display content, the piecewise modification including a plurality non-linear transfer functions, each uniquely based on the scaling factor.

7. The method of claim 6, wherein each of the plurality non-linear transfer functions is associated with a range that is based on the scaling factor.

8. The method of claim 4:
    wherein applying the non-linear modification that is independent of the scaling factor to the other portion of the second display content comprises applying the non-linear modification without applying the inverse of the scaling factor to the other portion of the second display content; and
    wherein the other portion of the second display content comprises content having a luminance that is outside the first luminance range of the first display content.

9. A method of operating a display of an electronic device, the method comprising:
- operating the display in a standard dynamic range mode to display first standard dynamic range content with a contrast;
- switching the display to a high dynamic range mode;
- receiving second standard dynamic range content for display by the display in the high dynamic range mode;
- applying a modification to the second standard dynamic range content to create headroom for display of high dynamic range content; and
- applying a correction to the modified second standard dynamic range content, based on the headroom, to match a contrast of the modified second standard dynamic range content to the contrast of the first standard dynamic range content.

10. The method of claim 9, further comprising displaying the modified corrected standard dynamic range content with the display in the high dynamic range mode.

11. The method of claim 10, further comprising displaying high dynamic range content concurrently with displaying the modified corrected standard dynamic range content with the display in the high dynamic range mode.

12. The method of claim 11, wherein displaying the high dynamic range content comprises displaying the high dynamic range content without applying the modification or the correction to the high dynamic range content.

13. The method of claim 11, wherein the modification comprises a linear scaling.

14. The method of claim 13, wherein the correction comprises an application of an opto-electronic transfer function that depends on an amount of the headroom.

15. The method of claim 14, wherein the opto-electronic transfer function comprises a piecewise function having a plurality of piecewise portions that are differently dependent on the amount of the headroom.

16. The method of claim 15, wherein the piecewise function defines a plurality of ranges for which each of the plurality of piecewise portions are to be applied, and each of which has a boundary defined in part by the amount of the headroom.

17. The method of claim 9, wherein switching the display to a high dynamic range mode comprises increasing, by a headroom factor, a luminance output of pixels of the display.

\* \* \* \* \*